United States Patent
Ryu et al.

(10) Patent No.: US 11,974,241 B2
(45) Date of Patent: Apr. 30, 2024

(54) METHOD AND DEVICE FOR TRANSMITTING OR RECEIVING SYNCHRONIZATION SIGNAL IN WIRELESS COMMUNICATION SYSTEM

(71) Applicant: Samsung Electronics Co., Ltd., Suwon-si (KR)

(72) Inventors: Hyunseok Ryu, Suwon-si (KR); Jeongho Yeo, Suwon-si (KR); Jinyoung Oh, Suwon-si (KR); Sungjin Park, Suwon-si (KR); Jonghyun Bang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 305 days.

(21) Appl. No.: 17/309,145

(22) PCT Filed: Oct. 14, 2019

(86) PCT No.: PCT/KR2019/013442
§ 371 (c)(1),
(2) Date: Apr. 29, 2021

(87) PCT Pub. No.: WO2020/091264
PCT Pub. Date: May 7, 2020

(65) Prior Publication Data
US 2022/0015047 A1 Jan. 13, 2022

(30) Foreign Application Priority Data
Nov. 1, 2018 (KR) .................. 10-2018-0133145

(51) Int. Cl.
*H04W 72/04* (2023.01)
*H04W 4/40* (2018.01)
(Continued)

(52) U.S. Cl.
CPC .......... *H04W 56/001* (2013.01); *H04W 4/40* (2018.02); *H04W 92/18* (2013.01)

(58) Field of Classification Search
CPC ... H04W 56/001; H04W 4/40; H04W 52/262; H04W 56/0015; H04W 56/002;
(Continued)

(56) References Cited

U.S. PATENT DOCUMENTS 7,983,702 B2  7/2011  Li et al.
8,705,421 B2  4/2014  Li et al.
(Continued)

FOREIGN PATENT DOCUMENTS

CN      107852685 A      3/2018
KR    10-2017-0112799 A   10/2017
WO      2017/123047 A1    7/2017

OTHER PUBLICATIONS

International Search Report and Written Opinion of the International Searching Authority in connection with International Application No. PCT/KR2019/013442 dated Jan. 21, 2020, 9 pages.
(Continued)

*Primary Examiner* — Phuc H Tran

(57) ABSTRACT

The disclosure provides a communication method performed by a vehicle-to-everything (V2X) user equipment (UE) in a wireless communication network, the communication method including: receiving, from a plurality of sidelink (SL) synchronization sources, at least one sidelink synchronization signal (SLSS), based on priority order information; and performing V2X communication based on the received at least one SLSS.

18 Claims, 7 Drawing Sheets

(51) Int. Cl.
*H04W 56/00* (2009.01)
*H04W 92/18* (2009.01)

(58) Field of Classification Search
CPC ............... H04W 72/21; H04W 74/008; H04W 74/0833; H04W 76/27; H04W 80/02; H04W 92/18; H04B 1/713; H04B 17/26; H04B 17/318; H04B 17/327; H04L 1/1664; H04L 1/1819; H04L 1/189; H04L 5/0051; H04L 5/0055
See application file for complete search history.

(56) References Cited

U.S. PATENT DOCUMENTS

| | | | |
|---|---|---|---|
| 2017/0289935 A1* | 10/2017 | Yoon | H04W 56/001 |
| 2018/0220388 A1 | 8/2018 | Chae et al. | |
| 2019/0037513 A1* | 1/2019 | Yang | H04W 56/002 |
| 2021/0195543 A1* | 6/2021 | Lee | H04W 56/0015 |
| 2021/0250881 A1* | 8/2021 | Lee | H04W 56/001 |
| 2021/0360549 A1* | 11/2021 | Lee | H04W 56/006 |
| 2021/0377943 A1* | 12/2021 | Park | H04W 72/0453 |

OTHER PUBLICATIONS

Huawei, et al. "Sidelink synchronization mechanisms for NR V2X," R1-1808094, 3GPP TSG RAN WG1 Meeting #94, Gothenburg, Sweden, Aug. 20-24, 2018, 4 pages.
Vivo, "NR sidelink synchronization mechanism," R1-1808244, 3GPP TSG RAN WG1 Meeting #94, Gothenburg, Sweden, Aug. 20-24, 2018, 3 pages.
LG Electronics, "Discussion on sidelink synchronization mechanism," R1-1808521, 3GPP TSG RAN WG1 Meeting #94, Gothenburg, Sweden, Aug. 20-24, 2018, 4 pages.
Supplementary European Search Report dated Nov. 22, 2021, in connection with European Application No. EP19877636.1, 13 pages.
CATT, "Discussion on synchronization mechanism for NR V2X Sidelink," R1-1810541, 3GPP TSG RAN WG1 Meeting #94bis, Chengdu, China, Oct. 8-12, 2018, 8 pages.
Intel Corporation, "Sidelink Synchronization for NR V2X Communication," R1-1810774, 3GPP TSG RAN WG1 Meeting #94bis, Chengdu, China, Oct. 8-12, 2018, 12 pages.
Itri, "Considerations on Sidelink Synchronization Enhancement for NR V2X," R1-1810940, 3GPP TSG-RAN WG1 Meeting #94bis, Chengdu, China, Oct. 8-12, 2018, 6 pages.
Intellectual Property India, "Examination report under sections 12 &13 of the Patents Act," issued Feb. 22, 2022, in connection with Indian Patent Application No. 202137020498, 6 pages.
Office Action dated Oct. 31, 2023, in connection with Korean Patent Application No. 10-2018-0133145, 5 pages.
Office Action dated Oct. 26, 2023, in connection with European Patent Application No. 19877636.1, 5 pages.
Hearing Notice dated Dec. 18, 2023, in connection with Indian Patent Application No. 202137020498, 3 pages.
Office Action issued Feb. 5, 2024, in connection with Chinese Patent Application No. 201980086339.9, 10 pages.

* cited by examiner a. Unicast V2X communication b. Groupcast V2X communication

METHOD AND DEVICE FOR TRANSMITTING OR RECEIVING SYNCHRONIZATION SIGNAL IN WIRELESS COMMUNICATION SYSTEM

CROSS-REFERENCE TO RELATED APPLICATIONS

This application is a 371 National Stage of International Application No. PCT/KR2019/013442 filed Oct. 14, 2019, which claims priority to Korean Patent Application No. 10-2018-0133145 filed Nov. 1, 2018, the disclosures of which are herein incorporated by reference in their entirety.

BACKGROUND

1. Field

The disclosure relates to a method of transmitting and receiving a synchronization signal between terminals.

2. Description of Related Art

To meet increasing demand with respect wireless data traffic after the commercialization of 4th generation (4G) communication systems, efforts have been made to develop 5th generation (5G) or pre-5G communication systems. For this reason, 5G or pre-5G communication systems are called 'beyond 4G network' communication systems or 'post long term evolution (post-LTE)' systems. The 5G communication system defined in the 3rd Generation Partnership Project (3GPP) is called a New Radio (NR) system. To achieve high data rates, implementation of 5G communication systems in an ultra-high frequency or millimeter-wave (mmWave) band (e.g., a 60-gigahertz (GHz) band) is being considered. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied and applied to the NR system. To improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, 5G communication such as sensor networks, M2M communication, MTC, and the like is being implemented by using techniques including beamforming, MIMO, array antennas, and the like. Application of cloud radio access network (Cloud-RAN) as the above-described big data processing technology may be an example of convergence of 5G communication technology and IoT technology.

As various services can be provided due to the aforementioned technical features and development of mobile communication systems, there is a demand for a method for effectively controlling transmission and reception of a synchronization signal for efficient communication.

SUMMARY

The disclosure provides an efficient communication method in a wireless communication network.

Solution to Problem

The disclosure relates to a method and apparatus for transmitting and receiving a sidelink synchronization signal to support high reliability and a high data rate in an environment where a $4^{th}$ generation (4G) base station and a $5^{th}$ generation (5G) base station coexist.

According to disclosed embodiments, provided are an apparatus and method for effectively providing a service in a mobile communication system.

DETAILED DESCRIPTION

Figure 1:
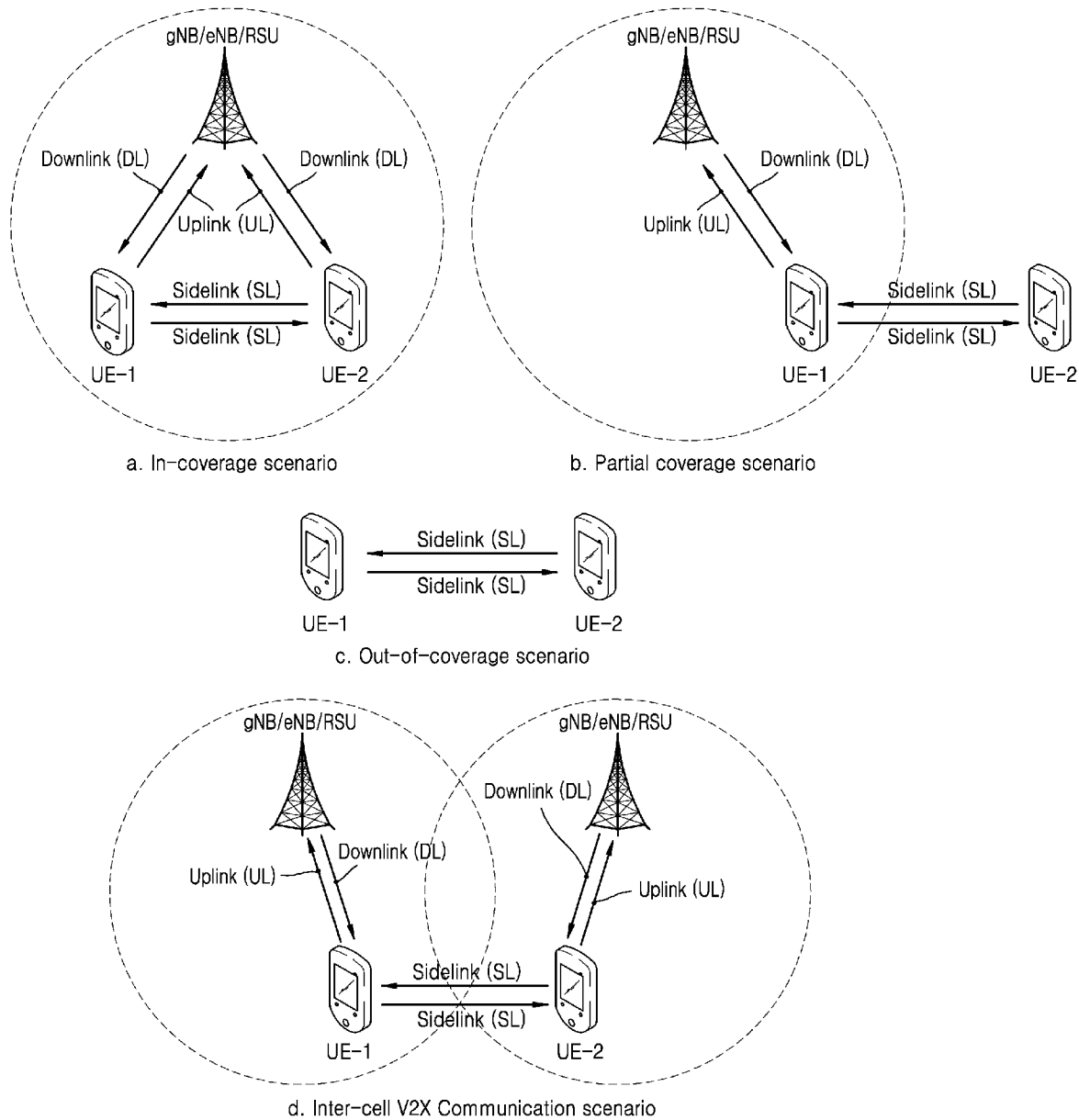
FIG. 1 illustrates an example of a system for describing some embodiments of the disclosure.

According to an embodiment of the disclosure, a communication method performed by a vehicle-to-everything (V2X) user equipment (UE) in a wireless communication network may include: receiving, from a plurality of sidelink (SL) synchronization sources, at least one sidelink synchronization signal (SLSS), based on priority order information; and performing V2X communication based on the received at least one SLSS, and wherein the plurality of SL synchronization sources include a global navigation satellite system (GNSS), an evolved node B (eNB), a next-generation node B (gNB), or another V2X UE, and a priority order of an SLSS based on the eNB and a priority order of an SLSS based on the gNB are equal.

The receiving of the received at least one SLSS may include receiving at least one of a first-type SLSS directly received from the GNSS, a second-type SLSS received from a V2X UE directly synchronizing with the GNSS, a third-type SLSS received from a V2X UE indirectly synchronizing with the GNSS, a fourth-type SLSS directly received from the eNB or the gNB, a fifth-type SLSS received from a V2X UE directly synchronizing with the eNB or the gNB, a sixth-type SLSS received from a V2X UE indirectly synchronizing with the eNB or the gNB, and a seventh-type SLSS received from a preset V2X UE that does not directly or indirectly synchronize with the GNSS, the eNB, or the gNB.

The third-type SLSS may be an SLSS received from a V2X UE that directly synchronizes with the GNSS or a V2X UE that synchronizes with a V2X UE that indirectly synchronizes with the GNSS, and the sixth-type SLSS may be an SLSS received from a V2X UE that directly synchronizes with the eNB or the gNB or a V2X UE that synchronizes with a V2X UE that indirectly synchronizes with a base station.

The priority order information may include information about respective priority orders of the first-type SLSS to the seventh-type SLSS.

The priority order information may include information in which the first-type SLSS or the fourth-type SLSS is configured to have a highest priority order.

The priority order information may be provided by one base station from among a plurality of base stations connected to the V2X UE, may be provided by a serving base station, or may be pre-configured.

The performing of the V2X communication based on the at least one SLSS may further include, when a plurality of SLSSs having a same priority order are received, selecting one SLSS, and the selecting of the one SLSS may include selecting the one SLSS, based on results of comparisons between a preset threshold value and reference signal received power (RSRP) values of the plurality of SLSSs having the same priority order.

The selecting of the one SLSS may include, when a plurality of SLSSs exceed the preset threshold value, selecting an SLSS having a largest RSRP value, and when the plurality of SLSSs exceeding the preset threshold value do not exist, selecting an SLSS based on timing information of the V2X UE.

The RSRP values may be measured through a demodulation reference signal (DMRS) transmitted through a physical sidelink broadcast channel (PSBCH) or a DMRS transmitted through a downlink broadcast channel.

The communication method may further include: obtaining, from a base station, SLSS transmission configuration information; and transmitting an SLSS configured by the base station to a preset V2X UE, based on the SLSS transmission configuration information.

The transmitting of the SLSS configured by the base station to the preset V2X UE may include transmitting the SLSS configured by the base station to the preset V2X UE, based on at least one of a RSRP threshold value in the SLSS transmission configuration information and a RSRP threshold value of a system information block (SIB) received by the V2X UE, and when the V2X UE is connected to a plurality of base stations, the RSRP threshold values may be configured to respectively correspond to the plurality of base stations.

According to an embodiment of the disclosure, a user equipment (UE) for vehicle-to-everything (V2X) may include: a transceiver; and at least one processor coupled with the transceiver and configured to receive, from a plurality of sidelink (SL) synchronization sources, at least one sidelink synchronization signal (SLSS), based on priority order information, select one SLSS, and perform V2X communication based on the selected SLSS, and wherein the plurality of SL synchronization sources may include a global navigation satellite system (GNSS), an evolved node B (eNB), a next-generation node B (gNB), or another V2X UE, and a priority order of an SLSS based on the eNB and a priority order of an SLSS based on the gNB may be equal.

The least one processor may be configured to receive at least one of a first-type SLSS directly received from the GNSS, a second-type SLSS received from a V2X UE directly synchronizing with the GNSS, a third-type SLSS received from a V2X UE indirectly synchronizing with the GNSS, a fourth-type SLSS directly received from the eNB or the gNB, a fifth-type SLSS received from a V2X UE directly synchronizing with the eNB or the gNB, a sixth-type SLSS received from a V2X UE indirectly synchronizing with the eNB or the gNB, and a seventh-type SLSS received from a preset V2X UE that does not directly or indirectly synchronize with the GNSS, the eNB, or the gNB.

The third-type SLSS may be an SLSS received from a V2X UE that directly synchronizes with the GNSS or a V2X UE that synchronizes with a V2X UE that indirectly synchronizes with the GNSS, and the sixth-type SLSS may be an SLSS received from a V2X UE that directly synchronizes with the eNB or the gNB or a V2X UE that synchronizes with a V2X UE that indirectly synchronizes with a base station.

The priority order information may include information about respective priority orders of the first-type SLSS to the seventh-type SLSS.

Mode of Disclosure

Hereinafter, embodiments of the disclosure will now be described more fully with reference to the accompanying drawings.

In the following descriptions of embodiments, descriptions of techniques that are well known in the art and are not directly related to the disclosure are omitted. This is to clearly convey the gist of the disclosure by omitting an unnecessary explanation. The terms used in the specification are defined in consideration of functions used in the disclosure, and can be changed according to the intent or commonly used methods of users or operators. Accordingly, definitions of the terms shall be understood based on the entire description of the present specification.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the disclosure and methods of achieving them will become apparent with reference to embodiments of the disclosure described in detail below with reference to the accompanying drawings. The disclosure may, however, be embodied in many different forms and should not be construed as limited to embodiments set forth herein; rather these embodiments are provided so that this disclosure will be thorough and complete, and will fully convey the scope of the disclosure only defined by the claims to one of ordinary skill in the art. Throughout the specification, like reference numerals denote like elements.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used in the present embodiment refers to a software or hardware component, such as field-programmable gate array (FPGA) or application-specific integrated circuit (ASIC), which performs certain tasks. However, the term "unit" does not mean to be limited to software or hardware. A "unit" may be configured to be in an addressable storage medium or configured to operate one or more processors. Thus, a "unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the components and "units" may be combined into fewer components and "units" or may be further separated into additional components and "units". Further, the components and "units" may be implemented to operate one or more central processing units (CPUs) in a device or a secure multimedia card. Also, in embodiments, a "unit" may include one or more processors.

When particularly describing embodiments of the disclosure, a New RAN (NR) that is a radio access network and a packet core (5G System, 5G Core Network, or NG Core: Next Generation Core) that is a core network in 5G mobile communication standards defined by 3GPP that is a mobile communication standard organizing group are main targets, but the essential concept of the disclosure may be modified without departing from the scope of the disclosure and may be applied to other communication system based on similar technical backgrounds, and the application may be made based on determination by one of ordinary skill in the art.

In the 5G system, a network data collection and analysis function (NWDAF) may be defined to support network automation, the NWDAF referring to a network function for providing a function to analyze and provide data collected over a 5G network. The NWDAF may collect/store/analyze information from the 5G network and may provide a result to an unspecified network function (NF), and an analysis result may be independently used by each NF.

For convenience of descriptions, the disclosure uses some of terms and names defined in the $3^{rd}$ Generation Partnership Project (3GPP) long term evolution (LTE) standards (standards of 5G, NR, LTE, or similar system). However, the disclosure is not limited to these terms and names, and may be equally applied to communication systems conforming to other standards.

Hereinafter, terms identifying an access node, terms indicating network entities, terms indicating messages, terms indicating an interface between network entities, and terms indicating various pieces of identification information, as used in the following description, are exemplified for convenience of description. Accordingly, the disclosure is not limited to terms to be described below, and other terms indicating objects having equal technical meanings may be used.

In the disclosure, a base station is an entity that allocates resources to a terminal, and may be at least one of a next-generation node B (gNB), an evolved node B (eNB), a Node B, a base station (BS), a radio access unit, a BS controller, or a node on a network. In the disclosure, a terminal may include a user equipment (UE), a mobile station (MS), a cellular phone, a smartphone, a computer, or a multimedia system capable of performing a communication function. However, the disclosure is not limited to the above example.

In particular, the disclosure may be applied to 3GPP NR ($5^{th}$ generation mobile communication standards). The disclosure is applicable to intelligent services (e.g., smart home, smart building, smart city, smart car or connected car, health care, digital education, retail, security, and safety services) based on 5G communication technology and Internet of things (IoT) technology. In the disclosure, an eNB may be interchangeably used with a gNB for convenience of description. That is, a BS described by an eNB may represent a gNB. Also, the term "terminals (UEs)" may refer to not only mobile phones, NB-IoT devices, and sensors but also other wireless communication devices.

Although LTE, LTE-A, LTE Pro, or 5G (or NR) systems are mentioned as examples in the following description, embodiments of the disclosure may also be applied to other communication systems having similar technical backgrounds or channel types. Furthermore, the embodiments of the disclosure may also be applied to other communication systems through partial modification without greatly departing from the scope of the disclosure based on determination by one of ordinary skill in the art.

To meet increasing demand with respect wireless data traffic after the commercialization of 4G communication systems, efforts have been made to develop 5G communication systems. To achieve a high data rate, 5G communication systems are designed to be implemented in an ultra-high frequency band (millimeter wave (mmWave)), e.g., a frequency band of 28 GHz. To reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. In addition thereto, unlike LTE, the 5G communication system supports various subcarrier spacings including 15 kHz, 30 kHz, 60 kHz, 120 kHz, or the like, and a physical control channel uses polar coding, and a physical data channel uses low density parity check (LDPC). In addition, as waveforms for uplink transmission, not only cyclic prefix-orthogonal frequency division multiplexing (CP-OFDM) but also discrete Fourier transform-spread-orthogonal frequency division multiplexing (DFT-S-OFDM) are used. LTE may support hybrid automatic repeat request (HARQ) retransmission in a transport block (TB) unit, but 5G may additionally support HARQ retransmission in a code block group (CBG) unit in which multiple code blocks (CBs) are grouped.

Also, to improve system networks for 5G communication systems, various technologies such as evolved small cells, advanced small cells, cloud radio access networks (Cloud-RAN), ultra-dense networks, device-to-device communication (D2D), wireless backhaul, vehicle communication network (vehicle-to-everything (V2X)), cooperative communication, coordinated multi-points (CoMP), and interference cancellation have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. To implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Various attempts are being made to apply 5G communication systems to the IoT network. For example, 5G communication such as sensor networks, M2M communication, MTC, and the like is being implemented by using techniques including beamforming, MIMO, array antennas, and the like. Application of cloud radio access network (Cloud-RAN) as the above-described big data processing technology may be an example of convergence of 5G communication technology and IoT technology. As such, a plurality of services may be provided to a user in a communication system, and in order to provide the plurality of services to a user, there is a need for a method of providing each service within a same time period according to a characteristic of each service, and an apparatus using the method. Various services provided by 5G communication systems are being studied, and one of the various services is a service that satisfies the requirements of low latency and high reliability.

For vehicle communication, LTE-based V2X has been standardized in 3GPP Rel-14 and Rel-15 based on D2D communication architecture, and currently, 5G NR-based V2X is being developed. NR V2X is to support unicast communication, groupcast (or multicast) communication, and broadcast communication between terminals. Also, unlike LTE V2X aimed for transmission and reception of basic safety information for driving of vehicles on roads, NR V2X is aimed to provide further advanced services such as platooning, advanced driving, extended sensor, remote driving, and the like.

Compared to the legacy 4G system, the NR system operates in a relatively high frequency band, and thus, due to a frequency characteristic, the NR system may have smaller coverage than the 4G system. To solve the coverage problem, dual connectivity (DC) management may be considered, in which an eNB (4G BS) that provides wide coverage serves as an anchor node (or a master node) for transmitting control information and data information, and a gNB (NR BS) that has smaller coverage but can guarantee a high data rate serves as a secondary node for transmitting data information. Therefore, a particular V2X terminal may operate by synchronizing with the eNB, and another V2X terminal may operate by synchronizing with the gNB. To support such scenario, NR V2X requires a method and apparatus for transmitting a synchronization signal between terminals, the method and apparatus being different from those of legacy LTE D2D or LTE V2X technology.

Accordingly, embodiments of the present specification are proposed to support the aforementioned scenario, and are aimed to provide a method and apparatus for transmitting and receiving a synchronization signal between terminals.

FIG. 1 illustrates an example of a system for describing some embodiments of the disclosure.

(a) of FIG. 1 illustrates an example of a case in which all V2X UEs (UE-1 and UE-2) are located within coverage of a BS.

All V2X UEs may receive, from the BS, data and control information through a downlink (DL), or may transmit, to the BS, data and control information through an uplink (UL). According to some embodiments, data and control information being transmitted and received by the V2X UEs may be data and control information for V2X communication. Alternatively, data and control information may be data and control information for general cellular communication. Also, the V2X UEs may transmit/receive data and control information for V2X communication through a sidelink (SL).

(b) of FIG. 1 illustrates an example of a case in which UE-1 of the V2X UEs is located within coverage of a BS and UE-2 is located outside the coverage of the BS. The example according to (b) of FIG. 1 may correspond to an example of partial coverage.

UE-1 located within the coverage of the BS may receive data and control information from the BS through a DL or may transmit data and control information to the BS through an UL. UE-2 located outside the coverage of the BS cannot receive data and control information from the BS through a DL, and cannot transmit data and control information to the BS through an UL. UE-2 may transmit/receive data and control information for V2X communication to/from UE-1 through a SL.

(c) of FIG. 1 illustrates an example of a case in which all V2X UEs are located outside coverage of a BS. Therefore, UE-1 and UE-2 cannot receive data and control information from the BS through a DL, and cannot transmit data and control information to the BS through an UL. UE-1 and UE-2 may transmit/receive data and control information for V2X communication through a SL.

(d) of FIG. 1 illustrates an example of a scenario in which UEs located in different cells perform V2X communication therebetween. In detail, in (d) of FIG. 1, a V2X transmission UE and a V2X reception UE access different BSs, are in a radio resource control (RRC) connected state (RRC Connected) with respect to the different BSs, or camp on the different BSs (RRC connection release state—i.e., RRC idle state). According to some embodiments, UE-1 may be the V2X transmission UE, and UE-2 may be the V2X reception UE. Alternatively, UE-1 may be the V2X reception UE, and UE-2 may be the V2X transmission UE. UE-1 may receive a V2X-dedicated system information block (SIB) from a BS to which UE-1 accesses (or on which UE-1 camps), and UE-2 may receive a V2X-dedicated SIB from another BS to which UE-2 accesses (or on which UE-2 camps). According to some embodiments, information of the V2X-dedicated SIB received by UE-1 may be different from information of the V2X-dedicated SIB received by UE-2. Accordingly, it is required to unify (or synchronize) a plurality of pieces of information so as to perform V2X communication between UEs located in different cells.

For convenience of descriptions, FIG. 1 illustrates a V2X system consisting of two UEs (UE-1 and UE-2) but is not limited thereto. Also, ULs and DLs between a BS and V2X UEs may each be called Uu interface, and a SL between the V2X UEs may be called PC5 interface. Accordingly, they may be interchangeably used in the disclosure.

In the disclosure, a terminal may indicate a vehicle that supports vehicular-to-vehicular (V2V) communication, a vehicle or a pedestrian's handset (i.e., a smartphone) which supports vehicular-to-pedestrian (V2P) communication, a vehicle that supports vehicular-to-network (V2N) communication, or a vehicle that supports vehicular-to-infrastructure (V2I) communication. Also, in the disclosure, a terminal may indicate a road side unit (RSU) having embedded therein terminal functions, a RSU having embedded therein BS functions, or a RSU having embedded therein some BS functions and some terminal functions.

Also, it is predefined that, in the disclosure, a BS indicates a BS that supports both V2X communication and legacy cellular communication or that supports only V2X communication. According to some embodiments, a BS may indicate a 5G BS (gNB), a 4G BS (eNB), or a RSU. Therefore, unless there is a particular description in the disclosure, a BS and a RSU may be used as the same, and thus may be interchangeably used.

Figure 2:
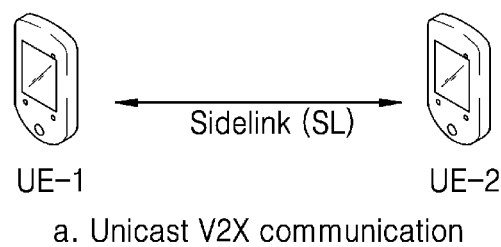
FIG. 2 illustrates an example of a vehicle-to-everything (V2X) communication method implemented through a sidelink (SL) according to an embodiment of the disclosure.
Figure 2:
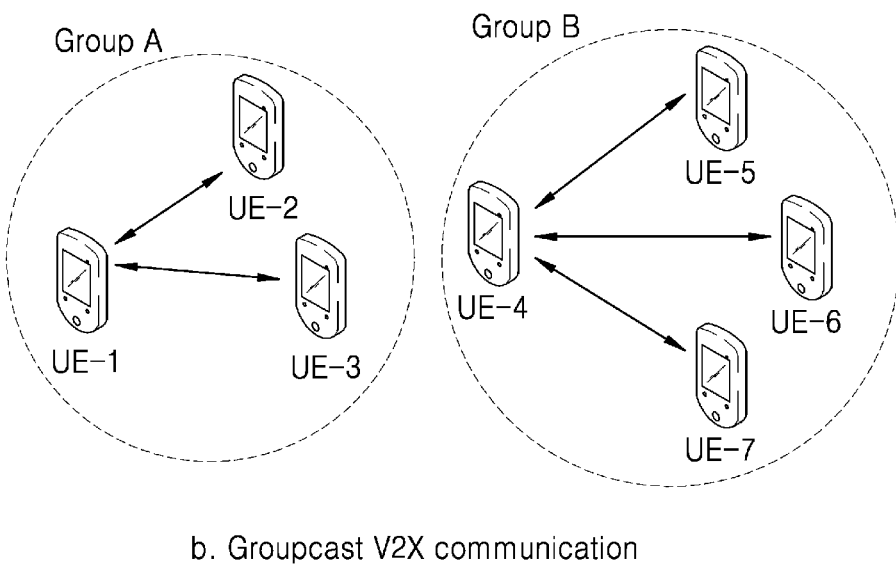

FIG. 2 illustrates an example of a V2X communication method implemented through a SL according to an embodiment of the disclosure.

As in (a) of FIG. 2, a transmission (TX) UE and a reception (RX) UE may perform one-to-one communication, and this may be called unicast communication. As in (b) of FIG. 2, a TX UE and a RX UE may perform one-to-many communication, and this may be called groupcast or multicast.

In (b) of FIG. 2, it is illustrated that UE-1, UE-2, and UE-3 form one group A to perform groupcast communication, and UE-4, UE-5, UE-6, and UE-7 form another group B to perform groupcast communication. Each UE performs groupcast communication only within a group to which each UE belong, and communication between different groups is not performed. (b) of FIG. 2 illustrates two formed groups, but the disclosure is not limited thereto.

Although not illustrated in FIG. 2, V2X UEs may perform broadcast communication. The broadcast communication refers to a case in which all V2X UEs receive data and control information transmitted from a V2X transmission UE through a SL. For example, when it is assumed that, in (b) of FIG. 2, UE-1 is a transmission UE for broadcast, all UEs (UE-2, UE-3, UE-4, UE-5, UE-6, and UE-7) may receive data and control information transmitted from UE-1.

Figure 3:
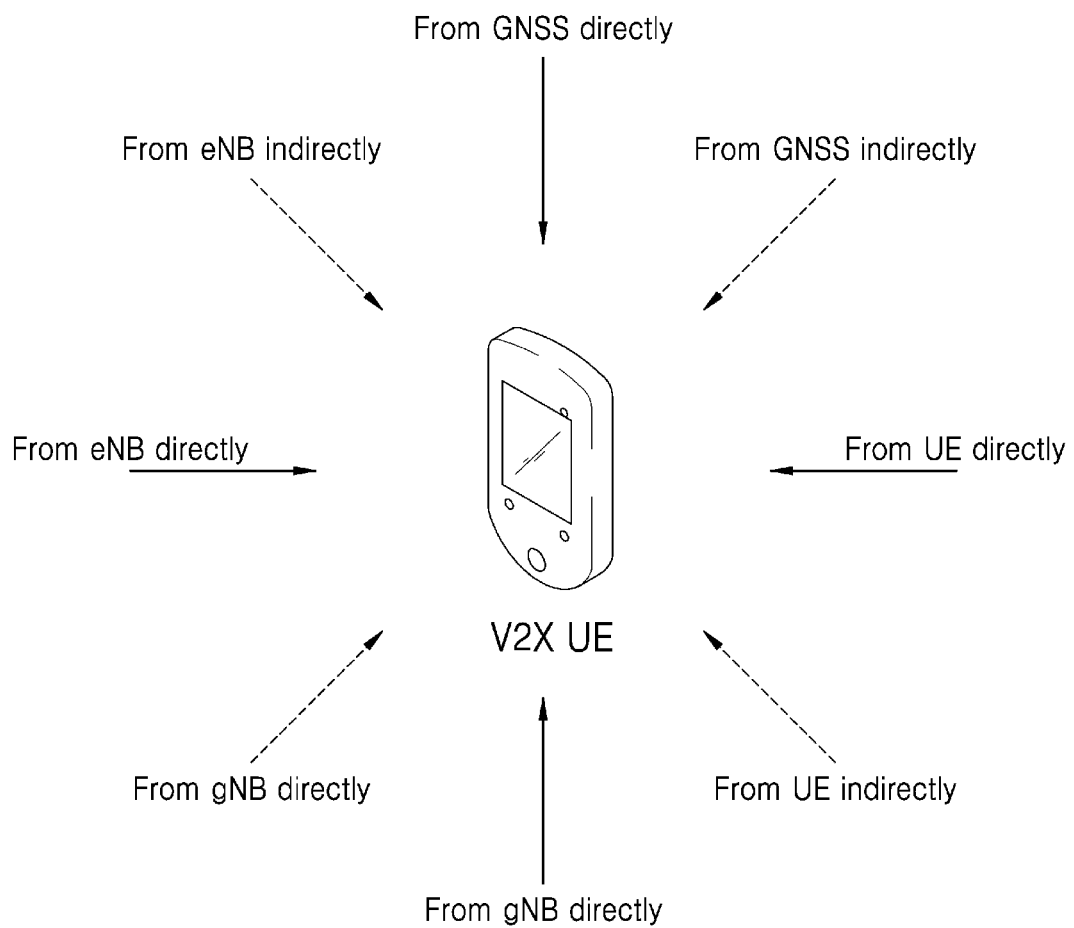
FIG. 3 illustrates an example of types of a synchronization signal V2X UE may receive, according to an embodiment of the disclosure.

FIG. 3 illustrates an example of types of a synchronization signal V2X UE may receive, according to an embodiment of the disclosure.

In detail, V2X UE may receive, from various sidelink synchronization signal sources, sidelink synchronization signals as below.

V2X UE may directly receive a synchronization signal from a global navigation satellite system (GNSS) or a global positioning system (GPS).

In this case, a SL synchronization signal source may be the GNSS.

V2X UE may indirectly receive a synchronization signal from the GNSS or the GPS.

Indirectly receiving a synchronization signal from the GNSS may indicate a case in which V2X UE-A receives a sidelink synchronization signal (SLSS) transmitted from V2X UE-1 that directly synchronizes with the GNSS. According to some embodiments, V2X UE-A may receive a synchronization signal from the GNSS via 2-hops. As another example, V2X UE-2 that synchronizes with the SLSS transmitted from V2X UE-1 that synchronizes with the GNSS may transmit a SLSS. Upon receiving this, V2X UE-A may receive a synchronization signal from the GNSS via 3-hops. Similarly, V2X UE-A may receive a synchronization signal from the GNSS via 3-hops or more.

In this case, a SL synchronization signal source may be another V2X UE that synchronizes with the GNSS.

V2X UE may directly receive a synchronization signal from a LTE BS (eNB).

V2X UE may directly receive primary synchronization signal (PSS)/secondary synchronization signal (SSS) transmitted from the LTE BS.

In this case, a SL synchronization signal source may be the eNB.

V2X UE may indirectly receive a synchronization signal from the LTE BS (eNB).

Indirectly receiving a synchronization signal from the eNB may indicate a case in which V2X UE-A receives a SLSS transmitted from V2X UE-1 that directly synchronizes with the eNB. According to some embodiments, V2X UE-A may receive a synchronization signal from the eNB via 2-hops. As another example, V2X UE-2 that synchronizes with the SLSS transmitted from V2X UE-1 that directly synchronizes with the eNB may transmit a SLSS. Upon receiving this, V2X UE-A may receive a synchronization signal from the eNB via 3-hops. Similarly, V2X UE-A may receive a synchronization signal from the eNB via 3-hops or more.

In this case, a SL synchronization signal source may be another V2X UE that synchronizes with the eNB.

V2X UE may indirectly receive a synchronization signal from a NR BS (gNB).

Indirectly receiving a synchronization signal from the gNB may indicate a case in which another V2X UE-A receives a SLSS transmitted from V2X UE-1 that directly synchronizes with the gNB. According to some embodiments, V2X UE-A may receive a synchronization signal from the gNB via 2-hops. As another example, V2X UE-2 that synchronizes with the SLSS transmitted from V2X UE-1 that directly synchronizes with the gNB may transmit a SLSS. Upon receiving this, V2X UE-A may receive a synchronization signal from the gNB via 3-hops. Similarly, V2X UE-A may receive a synchronization signal from the gNB via 3-hops or more.

In this case, a SL synchronization signal source may be another V2X UE that synchronizes with the gNB.

V2X UE-A may directly receive a synchronization signal from another V2X UE-B.

In a case where V2X UE-B cannot detect a SLSS transmitted from the GNSS, the gNB, the eNB, or another V2X UE, as a synchronization signal source, V2X UE-B may transmit a SLSS based on its own timing. V2X UE-A may directly receive the SLSS transmitted from V2X UE-B.

In this case, a SL synchronization signal source may correspond to V2X UE.

V2X UE-A may indirectly receive a synchronization signal from another V2X UE-B.

Indirectly receiving the synchronization signal from V2X UE-B may indicate a case in which V2X UE-A receives the SLSS transmitted from V2X UE-1 that directly synchronizes with V2X UE-B. According to some embodiments, V2X UE-A may receive the synchronization signal from V2X UE-B via 2-hops. As another example, V2X UE-2 that synchronizes with the SLSS transmitted from V2X UE-1 that directly synchronizes with V2X UE-B may transmit a SLSS. Upon receiving this, V2X UE-A may receive a synchronization signal from V2X UE-B via 3-hops. Similarly, V2X UE-A may receive a synchronization signal from V2X UE-B via 3-hops or more.

In this case, a SL synchronization signal source may be another V2X UE that synchronizes with V2X UE.

A SLSS described in the disclosure may indicate a sidelink synchronization signal block (S-SSB). The S-SSB may consist of a sidelink primary synchronization signal (S-PSS), a sidelink secondary synchronization signal (S-SSS), and a physical sidelink broadcast channel (PSBCH). According to some embodiments, the S-PSS may consist of a Zadoff-Chu sequence or M-sequence, and the S-SSS may consist of M-sequence or gold sequence. However, the disclosure is not limited thereto. Similar to PSS/SSS in a cellular system, a sidelink ID may be transmitted through a combination of the S-PSS and the S-SSS or through only the S-SSS, not the combination thereof. As a physical broadcast channel (PBCH) in the cellular system, the PSBCH may transmit a master information block (MIB) for sidelink communication.

Figure 4:
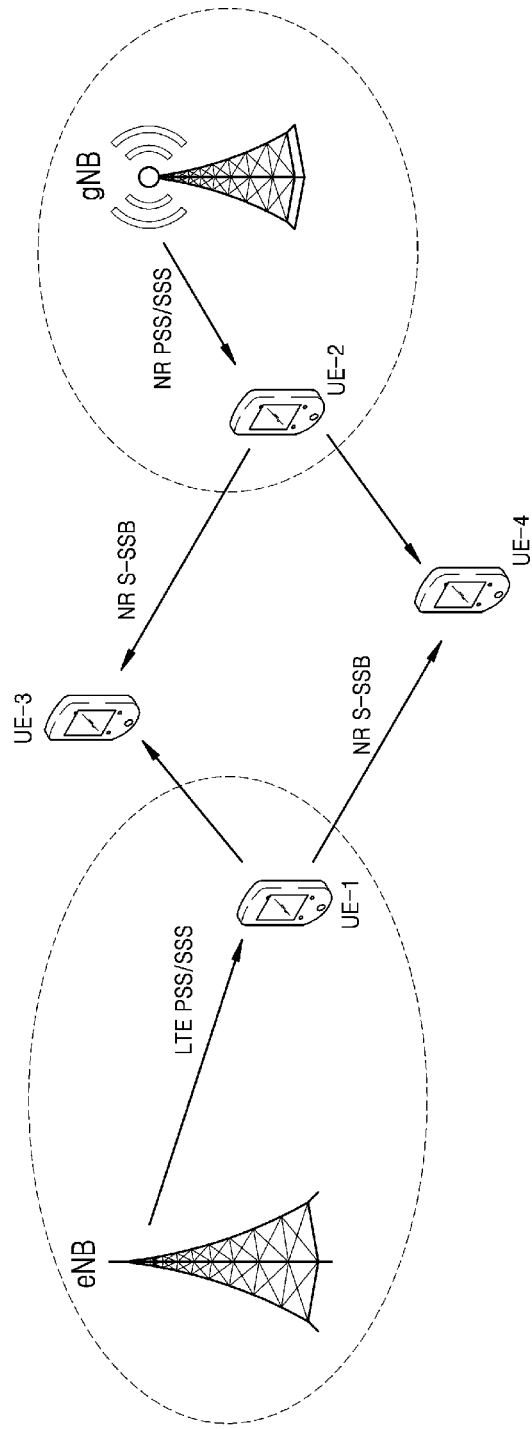
FIG. 4 illustrates an example of a case in which V2X UEs transmit and receive a sidelink synchronization signal (SLSS) according to an embodiment of the disclosure.

FIG. 4 illustrates a case in which V2X UEs transmit and receive an SLSS according to an embodiment of the disclosure.

UE-1 may exist within coverage of an eNB, and UE-2 may exist within coverage of a gNB. With respect to the eNB, UE-1 may be in an RRC connection configured state (RRC connected state) or may be in an RRC connection configuration released state (RRC idle state). According to some embodiments, it may be assumed that UE-1 synchronizes a DL with LTE PSS/SSS transmitted from the eNB. Equally, with respect to the gNB, UE-2 may be in an RRC connection configured state (RRC connected state) or may be in an RRC connection configuration released state (RRC idle state). Also, it may be assumed that UE-2 synchronizes a DL with NR PSS/SSS transmitted from the gNB. According to some embodiments, UE-1 and UE-2 may have capability of transmitting a NR SLSS, and UE-1 may have capability of receiving PSS/SSS from the eNB. When UE-1 is in an RRC connected state with respect to the eNB, UE-1 may transmit an SLSS, in response to an RRC command from the eNB. For example, the eNB may configure, by using a UE-specific RRC parameter, whether UE-1 having capability of transmitting an SLSS is to transmit an SLSS. Similarly, when UE-2 is in an RRC connected state with respect to the gNB, UE-2 may transmit an SLSS, in response to an RRC command from the gNB. For example, the gNB may configure, by using a UE-specific RRC parameter, whether UE-2 having capability of transmitting an SLSS is to transmit an SLSS. UE-1 and UE-2 in the RRC connected state may be configured with parameters for transmitting an SLSS, through UE-specific RRC from the eNB and the gNB, respectively. For example, the parameters may include at least one of time, frequency, or code resources for transmission of an SLSS, an ID constituting the SLSS, and the like.

When UE-1 is in an RRC idle state with respect to the eNB, UE-1 may determine whether to transmit an SLSS, based on a reference signal received power (RSRP) threshold value configured by the eNB through a SIB. For example, in a case where the RSRP threshold value configured by the eNB through the SIB is smaller than an RSRP value with respect to the eNB, the RSRP value being measured by UE-1, and UE-1 has capability of transmitting an SLSS, UE-1 may transmit an SLSS. When UE-2 is in an RRC idle state with respect to the gNB, UE-2 may determine whether to transmit an SLSS, based on an RSRP threshold value configured by the gNB through a SIB.

For example, in a case where the RSRP threshold value configured by the gNB through the SIB is smaller than an RSRP value measured by UE-2 with respect to the gNB, and UE-2 has capability of transmitting an SLSS, UE-2 may transmit an SLSS. UE-1 and UE-2 in the RRC idle state may be configured with parameters for transmitting an SLSS, through the SIB from the eNB and the gNB, respectively. For example, the parameters may include at least one of time, frequency, or code resources for transmission of an SLSS, an ID constituting the SLSS, and the like.

UE-1 and UE-2 may transmit SLSSs by using the parameters configured by the eNB and the gNB, respectively. In this regard, UE-3 and UE-4 may exist outside coverages of the eNB and the gNB. For example, when it is assumed that the eNB operates in f1 frequency band and the gNB operates in f2 frequency band, UE-3 and UE-4 may perform SL communication in f3 frequency band that is different from coverages of f1 and f2. In this regard, as illustrated in FIG. 2, the SL communication may correspond to one of unicast, groupcast, or broadcast communication schemes.

According to how UE-3 and UE-4 handle an SLSS transmitted from UE-1 synchronizing with the eNB and an SLSS transmitted from UE-2 synchronizing with the gNB, methods below may be considered.

Alt1: UE-3 and UE-4 equally handle the SLSS transmitted from UE-1 synchronizing with the eNB and the SLSS transmitted from UE-2 synchronizing with the gNB.

In this case, UE-3 and UE-4 do not need to distinguish between the SLSSs transmitted from UE-1 and UE-2. Therefore, UE-3 or UE-4 may perform operations below, based on a pre-configured SL RSRP threshold value.

UE-3 and UE-4 measure RSRP of the SLSSs transmitted from UE-1 and UE-2, and determine whether the measured RSRP satisfies an RSRP requirement. When both the SLSSs transmitted from UE-1 and UE-2 satisfy the RSRP requirement, UE-3 and UE-4 compare them with the pre-configured SL RSRP threshold value so as to determine whether the measured SL RSRP value is greater than the threshold value. In this regard, the RSRP measurement may be performed through a demodulation reference signal (DMRS) transmitted through a PSBCH.

In a case where minimum-RSRP requirement is satisfied and there is one SLSS received with RSRP greater than the pre-configured SL RSRP threshold value, an SLSS may be transmitted in synchronization with a UE that transmitted the one SLSS.

In a case where the minimum-RSRP requirement is satisfied and there are two or more SLSSs received with RSRP greater than the pre-configured SL RSRP threshold value, an SLSS may be transmitted in synchronization with a UE that transmitted an SLSS received with largest RSRP.

In a case where the minimum-RSRP requirement is satisfied and there is not an SLSS received with RSRP greater than the pre-configured SL RSRP threshold value, UE-3 or UE-4 may transmit an SLSS based on its own timing.

In a case where measurement results of SL RSRP of UE-1 and UE-2, which are received by UE-3 and UE-4, satisfy minimum-SL RSRP requirement, and are all greater than the pre-configured SL RSRP threshold value, UE-3 may synchronize with UE-1 through the afore-described operation (as illustrated in FIG. 4, it is assumed that UE-3 is closer to UE-1 than UE-2). Also, UE-4 may synchronize with UE-2 through the afore-described operation (as illustrated in FIG. 4, it is assumed that UE-4 is closer to UE-2 than UE-1).

Under this assumption, when UE-3 and UE-4 perform unicast, group cast, or broadcast communication, because UE-3 and UE-4 synchronize with different SL synchronization signal sources, synchronization between UE-3 and UE-4 may be different may not be matched). To solve this problem, UE-3 may transmit SL control information and data information to UE-4, in synchronization with timing of UE-1, and when UE-3 receives SL control information and data information from UE-4, UE-3 may synchronize with timing of UE-4. However this case may increase complexity of a UE, because the UE has to perform tracking on different timings. Also, in unicast and groupcast communications, a transmission UE and a reception UE perform feedback therebetween, and thus, when a transmission timing and a reception timing are different, a switching timing may be required to adjust the difference, and this may be a reason of deterioration in performance of SL communication whose requirement for latency is sensitive (strict).

In the examples above, it is assumed that a SL RSRP threshold value is pre-configured, but, the SL RSRP threshold value may be transmitted from UE-1 and UE-2 through the PSBCH. Also, according to some embodiments, the SL RSRP threshold value may be configured for each of unicast, groupcast, and broadcast. That is, SL RSRP threshold values that are respectively different with respect to V2X communication schemes may be transmitted through the PSBCH.

Also, in the examples above, it is assumed that the SL RSRP measurement is performed through the DMRS transmitted through the PSBCH, but the disclosure is not limited thereto. For example, the SL RSRP measurement may be performed through a DMRS transmitted through an SL control channel, a DMRS transmitted through an SL feedback channel, or a DMRS transmitted through an SL data channel. As another example, the SL RSRP measurement may be performed through a signal for SL measurement (e.g., a channel state information reference signal (CSI-RS)) transmitted through the SL data channel.

Alt1: UE-3 and UE-4 differently handle the SLSS transmitted from UE-1 synchronizing with the eNB and the SLSS transmitted from UE-2 synchronizing with the gNB.

To solve the problem of Alt1, the SLSS transmitted from UE-1 synchronizing with the eNB and the SLSS transmitted from UE-2 synchronizing with the gNB are differently transmitted, such that, when UE-3 or UE-4 receive them, UE-3 or UE-4 may identity the respective SLSSs.

According to some embodiments, the SLSS transmitted from UE-1 synchronizing with the eNB and the SLSS transmitted from UE-2 synchronizing with the gNB may use different sidelink synchronization signal IDs (SLSSIDs). In more detail, X cell IDs may be divided into 3 or 4 groups and managed. For example, a case where X cell IDs are divided into 3 groups and managed is provided below. X1 among X cell IDs may be used as SLSSIDs for SLSS transmission by a UE existing within coverage of the eNB, X2 among X cell IDs may be used as SLSSIDs for SLSS transmission by a UE existing within coverage of the gNB, and X3 among X cell IDs may be used as SLSSIDs for SLSS transmission by a UE not existing within coverages of the eNB and the gNB. In this regard, a UE that exists within coverage of the eNB but does not synchronize with PSS/SSS from the eNB but directly synchronizes with the GNSS may use at least one of X1 SLSSIDs. In this regard, a UE that does not directly synchronize with the GNSS cannot use an ID, which is used by the UE directly synchronizing with the GNSS, as an ID for SLSS transmission. Similarly, a UE that exists within coverage of the gNB but does not synchronize with PSS/SSS from the gNB but directly synchronizes with the GNSS may use at least one of X2 SLSSIDs. In this regard, a UE that does not directly synchronize with the GNSS cannot use an ID, which is used by the UE directly synchronizing with the GNSS, as an ID for SLSS transmission. In this regard, X1+X2+X3≤X may be realized.

As another example, a case where X cell IDs are divided into 4 groups and managed is provided below. X1, X2, and X3 among X cell IDs are equal to cases where 3 groups are managed (i.e., X1 is related to eNB coverage, X2 is related to gNB coverage, and X3 is related to outside coverage). The difference is that an ID used by a UE directly synchronizing with the GNSS within coverages of the eNB and the gNB is not used in X1 and X2 but is used in X4 that is another group. The number of IDs of SLSSs which configure X4 may be at least one. In this regard, X1+X2+X3+X4≤X may be realized.

In the examples above, it is defined that different IDs are used, but the disclosure is not limited thereto. For example, an SLSS transmitted from UE-1 synchronizing with the eNB may be distinguished from an SLSS transmitted from UE-2 synchronizing with the gNB by using a same ID and different sequences.

As another method to solve the problem of Alt1, the SLSS transmitted from UE-1 synchronizing with the eNB and the SLSS transmitted from UE-2 synchronizing with the gNB are equally transmitted, but, by using an identifier transmitted through the PSBCH, it is possible to identify whether it is an SLSS transmitted from a UE synchronizing with the eNB or an SLSS transmitted from a UE synchronizing with the gNB.

For example, UE-1 may add 1-bit indicator indicating OFF to a PSBCH to be transmitted by UE-1, and may transmit the PSBCH. UE-2 may add 1-bit indicator indicating ON to a PSBCH to be transmitted by UE-2, and may transmit the PSBCH. Upon reception of it, UE-3 and UE-4 may decode the PSBCH, thereby determining whether an SLSS is transmitted from UE-1 (i.e., whether it is transmitted from the UE synchronizing with the eNB) or is transmitted from UE-2 (i.e., whether it is transmitted from the UE synchronizing with the gNB).

Unlike to the example above, UE-1 may add 1-bit indicator indicating ON to a PSBCH, and may transmit the PSBCH, and UE-2 may add 1-bit indicator indicating OFF to a PSBCH to be transmitted by UE-2, and may transmit the PSBCH.

In the examples, it is described assuming that an indicator transmitted through a PSBCH is 1-bit but the disclosure is not limited thereto. For example, the indicator may be 2-bit. In this case, it may be additionally identified that it is an SLSS transmitted from a UE that synchronizes with the GNSS. As another example, in the examples, it is specified that UE-1 and UE-2 are UEs that directly synchronize with the eNB and gNB, respectively (1-hop), but, when 3-bit or more are used, it may be determined whether they are SLSSs transmitted from UEs that directly synchronize with the gNB and eNB via 1-hop or whether they are SLSSs transmitted from UEs that indirectly (e.g., via 2-hop) synchronize with the gNB and eNB. Equally, it may be determined whether it is an SLSS transmitted from a UE that directly synchronizes with the GNSS via 1-hop or whether it is an SLSS transmitted from a UE that indirectly (e.g., via 2-hop) synchronizes with the GNSS.

Figure 5:
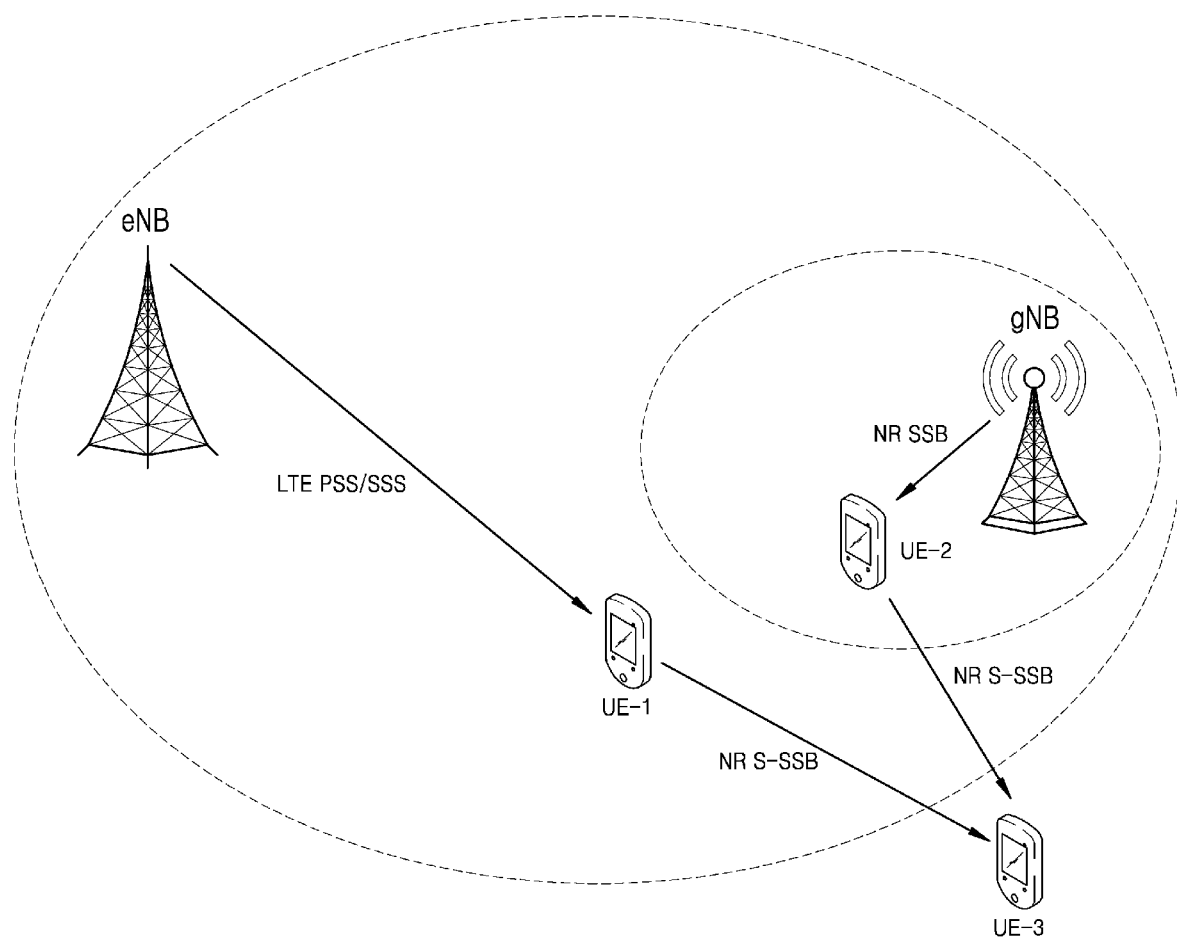
FIG. 5 illustrates another example of a case in which V2X user equipments (UEs) transmit and receive an SLSS according to an embodiment of the disclosure.

FIG. 5 illustrates another example of a case in which V2X UEs transmit and receive an SLSS.

In particular, the example relates to the case in which the V2X UEs transmit and receive an SLSS in an E-UTRA and NR Dual Connectivity (EN-DC) environment where an eNB and a gNB coexist. The 5G system operates in a relatively high frequency band, compared to the legacy 4G system, such that, due to a frequency characteristic, the 5G system may have smaller coverage than the 4G system. To solve the coverage problem, DC may be considered, in which the eNB that provides wide coverage serves as an anchor node (or a master node) for transmitting control information and data information, and the gNB that has smaller coverage but can guarantee a high data rate serves as a secondary node for transmitting data information. In the DC environment, some V2X UEs may be present within coverage of the eNB but some may exist outside coverage of the gNB (e.g., UE-1). Also, some V2X UEs may exist within coverages of both the eNB and the gNB (e.g., UE-2). In this regard, UE-1 may receive, from the eNB, information for SLSS transmission, and UE-2 may receive, from the gNB, information for SLSS transmission. Upon reception of the SLSS, UE-3 may synchronize with UE-1 or UE-2 by using the methods described with reference to FIG. 4. In this regard, it may be assumed that UE-1 and UE-2 are UEs having capability of supporting EN-DC.

To enhance coverage performance of SLSSs transmitted from UEs existing within cell coverage, SLSS transmission UEs that exist within a same cell may be required to transmit a same signal. That is, a same SLSS ID and a same PSBCH may be transmitted. In more detail, when it is assumed that there are two UEs within a same CELL so as to transmit an SLSS, the two UEs may transmit same SLSS IDs and PSBCHs with same contents. Upon reception, a UE receives a signal obtained by combining two same signals, and thus, reception power may be amplified. However, as in FIG. 5, although UE-1 and UE-2 exist within coverage of the same eNB, UE-1 may transmit an SLSS based on parameters configured (or indicated) by the eNB, and UE-2 may transmit an SLSS based on parameters configured (or indicated) by the gNB. Thus, when UE-1 and UE-2 transmit a same SLSS, coverage of the SLSS may be decreased. Also, when UE-1 and UE-2 transmit SLSSs configured with different parameters, although not illustrated in FIG. 5, interference may occur in a DL reception signal of another cellular UE, or interference may occur in a UL signal of the other cellular UE which is received by the eNB or the gNB.

To solve this problem, it is requested for UE-1 to previously detect existence of the gNB or it is requested for UE-2 to previously detect existence of the eNB. To enable this pre-detection, it is requested for UE-1 and UE-2 to be in an RRC connected state with respect to the eNB that is a master node. This is because the eNB that is the master node transmits information of existence or non-existence of a secondary node to a UE through RRC configuration. A UE has to be designed to perform a V2X operation not only in an RRC connected state but also in an RRC idle state with respect to the eNB or the gNB.

As described above, in view of coverage of an SLSS, it is requested for UE-1 and UE-2 shown in FIG. 5 to transmit a same SLSS, but parameters such as a reference timing, a subcarrier spacing, a waveform (i.e., DFT-S-OFDM or CP-OFDM), a CP length, and the like which are used by the eNB and the gNB may differ in the eNB and the gNB. Thus, it may be unavailable for UE-1 and UE-2 to transmit a same SLSS. In this case, UE-1 and UE-2 may operate as below.

Alt1: A master node may indicate, through system information, configuration for a UE with whether to synchronize with a timing of the master node or a timing of the secondary node, the UE existing within coverage of the master node.

As illustrated in FIG. 5, in the EN-DC environment, UE-1 and UE-2 may receive V2X-dedicated SIB transmitted by the eNB, and may obtain priority order information with respect to selection of a SL synchronization signal source which is included in the SIB. For example, in response to reception of configuration by which eNB timing has a priority order higher than that of gNB timing, UE-1 and UE-2 may transmit an SLSS based on eNB timing. On the contrary, in response to reception of configuration by which eNB timing has a priority order lower than that of gNB timing, UE-1 and UE-2 may transmit an SLSS based on gNB timing. The configuration may be transmitted as V2X-dedicated SIB by using various methods below.

The V2X-dedicated SIB may include SL synchronization signal source information. When a SL synchronization signal source is configured as the eNB, a UE to transmit an SLSS may transmit the SLSS based on eNB timing. When the SL synchronization signal source is configured as the gNB, a UE to transmit an SLSS may transmit the SLSS based on gNB timing.

As another example, 1-bit information may be used. That is, '1' may indicate to synchronize with timing of the master node, and '0' may indicate to synchronize with timing of the secondary node.

As another example, the afore-mentioned SL synchronization signal source information may include an identifier of a cell. That is, when the SL synchronization signal source is configured as cell ID A, a UE may transmit an SLSS based on timing of the cell with the cell ID A.

With the afore-mentioned SL synchronization signal source information, information indicating a priority order of the GNSS and base stations may be additionally transmitted. That is, priority order information about one of eNB>gNB>GNSS/gNB>eNB>GNSS/eNB>GNSS>gNB/ gNB>GNSS>eNB/GNSS>gNB>eNB/GNSS>eNB>gNB may be transmitted to a UE by using 3-bit information of the V2X-dedicated SIB.

The examples above correspond to operations for UEs in an RRC idle state with respect to the master node, and UEs in an RRC connected state with respect to the master node may receive, through UE-specific RRC configuration, SL synchronization signal source information from the master node.

UEs that exist within coverage of the master node but are not configured with the SL synchronization signal source information or UE that exist outside the coverage may determine whether to synchronize with eNB timing or whether to synchronize with gNB timing, by considering the eNB and the gNB to have a same priority order (i.e., Alt1 in the example of FIG. 4) or based on a pre-configured priority rule.

An EN-DC management scenario may be classified to synchronous EN-DC in which the eNB and the gNB operate by synchronizing with each other with respect to timing and asynchronous EN-DC in which the eNB and the gNB operate by asynchronizing with each other with respect to timing In synchronous EN-DC, the eNB and the gNB may each synchronize with the GNSS or may synchronize with each other with respect to timing via signaling between the eNB and the gNB without the GNSS, and may operate. In management of synchronous EN-DC, because timing synchronizations of the eNB and the gNB are equal, UE-1 or UE-2 which is to transmit an SLSS may synchronize with one of eNB timing or gNB timing. Therefore, whether it is synchronous EN-DC or asynchronous EN-DC may be additionally indicated to a UE through V2X-dedicated SIB or UE-specific RRC signaling, the UE transmitting an SLSS. As a signaling scheme to support the operation, one of methods below may be used.

Whether it is synchronous EN-DC or asynchronous EN-DC may be indicated using 1-bit. For example, when it is synchronous EN-DC, a particular bit field of V2X-dedicated SIB or UE-specific RRC may be set to '1'. Also, when it is asynchronous EN-DC, the particular field may be set to '0'. When set to '1', a UE to transmit an SLSS may transmit the SLSS according to eNB or gNB timing. According to some embodiments, the UE may randomly select one of eNB or gNB timing or may synchronize with timing of a BS that provides largest RSRP. When set to '0', the UE may select the eNB or the gNB as an SL signal source, based on a predefined rule. For example, it may be predefined that a priority order of the eNB is always higher than that of the gNB. In this case, the UE may transmit an SLSS, based on eNB timing.

As another example, when information about a priority order of the eNB and the gNB is included in V2X-dedicated SIB or UE-specific RRC parameter, the UE may assume that it is asynchronous EN-DC, and may select an SL synchronization signal source according to the priority order. When the information about a priority order of the eNB and the gNB is not included in V2X-dedicated SIB or UE-specific RRC parameter, the UE may assume that it is synchronous EN-DC, and may randomly select one of eNB or gNB timing or may synchronize with timing of a BS that provides largest RSRP.

In the examples above, the EN-DC environment in which the master node is the eNB and the secondary node is the gNB is mainly exemplified but the disclosure is not limited thereto. For example, even in an NE-DC environment in which the master node is the gNB and the secondary node is the eNB, the UE may select an SL synchronization signal source by using the afore-described various methods, according to configuration by a master node. As another example, even in an NN-DC environment in which the master node is the gNB and the secondary node is the eNB, the UE may select an SL synchronization signal source by using the afore-described various methods, according to configuration by a master node.

Alt2: A UE may follow a predefined rule about whether to synchronize with a timing of a master node or a timing of a secondary node.

Alt2 may be used in an environment in which a BS such as the eNB or the gNB does not exist. The predefined rule may vary, and at least one of priorities may be used.
GNSS>eNB>gNB>NR-UE (A priority order becomes higher to the left and becomes lower to the right.)
GNSS>gNB>eNB>NR-UE
eNB>gNB>GNSS>NR-UE
eNB>GNSS>gNB>NR-UE Which rule among the rules above is to be used may be pre-configured (pre-configuration).

Alt3: There may be a combination of Alt1 and Alt2.

For example, some priorities may satisfy the pre-defined rule, and other priorities may be configured. That is, whether to put a priority order to the GNSS or put a priority order to BS timing may be pre-configured or may be configured by the eNB/gNB. Also, a priority order between the eNB and the gNB may always satisfy a defined rule (e.g., the eNB always has a priority order higher than or equal to the gNB).

A procedure with respect to when to transmit an SLSS by UE-1 and UE-2 that exist within cell coverage in FIGS. 4 and 5 may be requested. For example, in FIG. 4, when UE-1 is in an RRC connected state with respect to the eNB, UE-1 may be configured with a command for transmission of an SLSS through UE-specific RRC from the eNB. Equally, when UE-2 is in an RRC connected state with respect to the gNB, UE-2 may be configured with a command for transmission of an SLSS through UE-specific RRC from the gNB. In this regard, it may be assumed that UE-1 and UE-2 have capability of transmitting an SLSS. However, a UE, as UE-2 of FIG. 5, that exists within coverage of the eNB and the gNB may be simultaneously configured with transmission of an SLSS from the eNB and the gNB. In this case, UE-2 may assume that a command transmitted from the master node has a higher priority order than a command transmitted from the secondary node. For example, in a case where the eNB commands transmission of an SLSS whereas the gNB did not command transmission of an SLSS, the UE may follow the command from the eNB (in a case where the master node is the eNB in the EN-DC environment) or may follow the command from the gNB (in a case where the master node is the gNB in the NE-DC environment or the master node is the gNB in the NN-DC environment).

As another example, UE-1 and UE-2 in FIG. 4 may be in an RRC idle state with respect to each of the eNB and the gNB. In this case, UE-1 and UE-2 may receive a UE-specific RRC command with respect to transmission of an SLSS from the eNB/gNB. Thus, a procedure with respect to when to transmit an SLSS by UEs in an RRC idle state may be requested. For example, UE-1 in an RRC idle state with respect to the eNB may receive V2X-dedicated SIB transmitted by the eNB, and may obtain a RSRP threshold value included in the SIB. Then, UE-1 may compare the RSRP threshold value with a RSRP measurement value measured by UE-1 with respect to the eNB. When the measured RSRP is smaller than the RSRP threshold value configured by the eNB, UE-1 may transmit an SLSS. Equally, UE-2 in an RRC idle state with respect to the gNB may receive V2X-dedicated SIB transmitted by the gNB, and may obtain a RSRP threshold value included in the SIB. Then, UE-2 may compare the RSRP threshold value with a RSRP measurement value measured by UE-2 with respect to the gNB. When the measured RSRP is smaller than the RSRP threshold value configured by the gNB, UE-2 may transmit an SLSS.

The aforementioned operation may also be applied to FIG. 5. However, because UE-2 in FIG. 5 exists within coverages of the gNB and the eNB, when an SLSS is transmitted based on the RSRP threshold value configured by the gNB, interference may occur to another UE that exists outside the coverage of the gNB and exists within the coverage of the eNB. Also, the reason why an SLSS is transmitted based on a RSRP threshold value is that, only when a UE located at cell boundary transmits an SLSS, UE-3 existing outside cell coverage can receive it. Thus, UE-2 may be located at a place that is a cell boundary of the gNB but is not a cell boundary of the eNB (e.g., in a case where UE-2 is located in the middle between the eNB and the gNB in FIG. 5). In this case, even when UE-2 satisfies the RSRP threshold value configured by the gNB and thus transmits an SLSS, the SLSS may not reach UE-3.

To solve this problem, operations below may be considered.

The master node may configure a threshold value for the master node and a threshold value for the secondary node through V2X-dedicated SIB. For example, RSRP threshold value-1 and RSRP threshold value-2. A UE having capability of transmitting an SLSS may respectively compare RSRP-1 and RSRP-2 with the configured RSRP threshold value-1 and RSRP threshold value-2, the RSRP-1 being measured by the UE with respect to the master node and the RSRP-2 being measured by the UE with respect to the secondary node. Only when RSRP-1<RSRP threshold value-1 and RSRP-2<RSRP threshold value-2 are simultaneously satisfied, the UE may transmit an SLSS. At this time, the UE is in an RRC idle state and thus may not detect existence of the secondary node. For this, ID of the secondary node for which the UE has to measure RSRP may be included in V2X-dedicated SIB.

When only one RSRP threshold value is configured in the V2X-dedicated SIB, the UE may measure RSRP with respect to a BS (the eNB for UE-1 and the gNB for UE-2) on which the UE camps. When the measured RSRP value is smaller than the configured RSRP threshold value, the UE may transmit an SLSS.

Although not illustrated in FIG. 5, because UE-2 exists within coverage of the gNB and coverage of the eNB, UE-2 may receive NR SSB from the gNB and may receive PSS/SSS from the eNB. In this case, UE-2 may perform a similar operation to UE-2. For example, operations below may be considered.

Alt1: The master node may configure, through system information or UE-specific RRC signaling, a UE in coverage of the master node with whether to synchronize with timing of the master node or to synchronize with timing of the secondary node.

UE-2 in the EN-DC environment as shown in FIG. 5 may receive V2X-dedicated SIB transmitted from the eNB, and may obtain priority order information with respect to selection of a SL synchronization signal source which is included in the SIB.

UE-2 in the EN-DC environment as shown in FIG. 5 may obtain priority order information with respect to selection of a SL synchronization signal source through UE-specific RRC signaling transmitted from the eNB.

Alt2: Even when a serving BS is not the master node, the serving cell may configure, through system information or UE-specific RRC signaling, a UE in coverage of the serving cell with whether to synchronize with timing of the master node or to synchronize with timing of itself (the serving cell).

UE-2 in the EN-DC environment as shown in FIG. 5 may receive V2X-dedicated SIB transmitted from the gNB, and may obtain priority order information with respect to selection of a SL synchronization signal source which is included in the SIB.

UE-2 in the EN-DC environment as shown in FIG. 5 may obtain priority order information with respect to selection of a SL synchronization signal source through UE-specific RRC signaling transmitted from the gNB.

Alt3: A UE may satisfy a predefined rule about whether to synchronize with timing of the master node or whether to synchronize with timing of the secondary node.

Accordingly, the disclosure relates to a method of transmitting and receiving a synchronization signal between UEs in a wireless communication system, and more particularly, embodiments of a method and apparatus for transmitting and receiving an SLSS in an environment where a 4G BS and a 5G BS coexist are provided.

Figure 6:
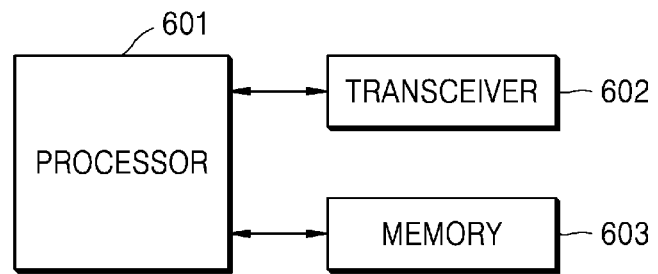
FIG. 6 illustrates a detailed structure of a UE according to an embodiment of the disclosure.

FIG. 6 illustrates a detailed structure of a UE according to an embodiment of the disclosure.

As illustrated in FIG. 6, the UE of the disclosure may include a processor 601, a transceiver 602, and a memory 603. However, elements of the UE are not limited to an example described above. For example, the UE may include more elements than the afore-described elements or may include fewer elements than the afore-described elements. Furthermore, the processor 601, the transceiver 602, and the memory 603 may be implemented as one chip.

According to some embodiments, the processor 601 may control a series of processes to allow the UE to operate according to the aforementioned embodiment of the disclosure. For example, the processor 601 may control the elements of the UE to perform a method of transmitting and receiving a synchronization signal of a SL UE according to an embodiment of the disclosure. The processor 601 may refer to a plurality of processors, and may perform afore-described synchronization signal transmitting and receiving operations of the SL UE, by executing a program stored in the memory 603.

Also, according to some embodiments, the processor 601 may control the transceiver 602 to transmit or receive a synchronization signal from or to the GPS, the GNSS, the SL UE such as V2X UE, or a BS. Also, when a plurality of synchronization signals are received, the processor 601 may identify the received plurality of synchronization signals, and may perform synchronization based on a synchronization signal selected based on a preset criterion or a priority order.

Also, according to some embodiments, the processor 601 may determine which synchronization signal corresponding to which node is to be transmitted. According to some embodiments, synchronization signal configuration information may include information indicating which node's timing is to be synchronized, priority order information, and identification information about whether it is synchronous EN-DC or asynchronous EN-DC, but the disclosure is not limited thereto and thus, the synchronization signal configuration information may include all information associated with a synchronization signal.

The transceiver 602 may transmit or receive a signal to or from the BS. The signal transmitted or received to or from the BS may include control information and data. The transceiver 602 may include a radio frequency (RF) transmitter configured to up-convert and amplify a frequency of a transmitted signal, and a RF receiver configured to low-noise amplify a received signal and down-convert a frequency thereof. However, the configuration of the transceiver 602 is merely an example, and elements of the transceiver 602 are not limited to the RF transmitter and the RF receiver. Also, the transceiver 602 may receive a signal by using a radio channel and output the signal to the processor 601, and may transmit a signal output from the processor 601, by using a radio channel.

According to some embodiments, the memory 603 may store programs and data required for the UE to operate. Also, the memory 603 may store control information or data included in a signal transmitted or received by the UE. The memory 603 may include any or a combination of storage media such as read-only memory (ROM), random access memory (RAM), a hard disk, a compact disc (CD)-ROM, and a digital versatile disc (DVD). Also, the memory 603 may refer to a plurality of memories. According to some embodiments, the memory 603 may store a program for performing an operation of transmitting and receiving a synchronization signal in an SL communication according to the afore-described embodiments of the disclosure.

Figure 7:
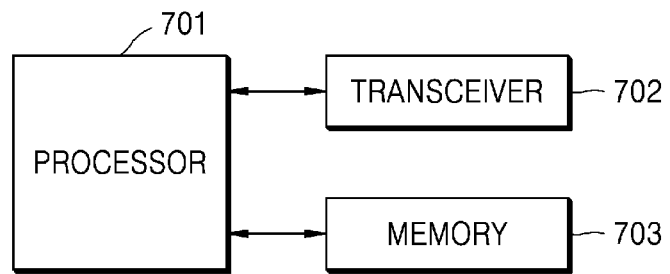
FIG. 7 illustrates a detailed structure of a base station (BS) according to an embodiment of the disclosure.

FIG. 7 illustrates a detailed structure of a BS according to an embodiment of the disclosure.

As illustrated in FIG. 7, the BS of the disclosure may include a processor 701, a transceiver 702, and a memory 703. However, elements of the BS are not limited to an example described above. For example, the BS may include more elements than the afore-described elements or may include fewer elements than the afore-described elements. Furthermore, the processor 701, the transceiver 702, and the memory 703 may be implemented as one chip.

The processor 701 may control a series of processes to allow the BS to operate according to the aforementioned embodiment of the disclosure. For example, the processor 701 may control the elements of the BS to perform a method of transmitting and receiving a synchronization signal in a wireless communication system according to an embodiment of the disclosure.

The transceiver 702 may transmit or receive a signal to or from the UE. The signal transmitted or received to or from the UE may include control information and data. The transceiver 702 may include a RF transmitter configured to up-convert and amplify a frequency of a transmitted signal, and a RF receiver configured to low-noise amplify a received signal and down-convert a frequency thereof. However, the configuration of the transceiver 702 is merely an example, and elements of the transceiver 702 are not limited to the RF transmitter and the RF receiver. Also, the transceiver 702 may receive a signal by using a radio channel and output the signal to the processor 701, and may transmit a signal output from the processor 701, by using a radio channel. The processor 701 may refer to a plurality of processors, and may perform the method of transmitting and receiving a synchronization signal in a wireless communication system according to an embodiment of the disclosure, by executing a program stored in the memory 703.

According to some embodiments, the memory 703 may store programs and data required for the BS to operate. Also, the memory 703 may store control information or data included in a signal transmitted or received by the BS. The memory 703 may include any or a combination of storage media such as ROM, RAM, a hard disk, a CD-ROM, and a DVD. Also, the memory 703 may refer to a plurality of memories. According to some embodiments, the memory 703 may store a program for performing a method of controlling transmission power in a wireless communication system according to embodiments of the disclosure. The methods according to the embodiments of the disclosure as described herein or in the following claims may be implemented as hardware, software, or a combination of hardware and software.

When implemented as software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described herein or in the following claims.

The programs (e.g., software modules or software) may be stored in non-volatile memory including RAM or flash memory, ROM, electrically erasable programmable read only memory (EEPROM), a magnetic disc storage device, a CD-ROM, a DVD, another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as the Internet, an intranet, a local area network (LAN), a wide LAN (WLAN), and a storage area network (SAN). The storage device may be connected, through an external port, to an apparatus according to the embodiments of the disclosure. Another storage device on the communication network may also be connected to the apparatus performing the embodiments of the disclosure.

In the afore-described embodiments of the disclosure, elements included in the disclosure are expressed in a singular or plural form according to the embodiments of the disclosure. However, the singular or plural form is appropriately selected for convenience of description and the disclosure is not limited thereto. As such, an element expressed in a plural form may also be configured as a single element, and an element expressed in a singular form may also be configured as plural elements.

Meanwhile, the embodiments of the disclosure described with reference to the present specification and the drawings are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. Also, the embodiments may be combined to be implemented, when required. For example, the BS and the UE may be operated in a manner that portions of an embodiment of the disclosure are combined with portions of another embodiment of the disclosure. The embodiments of the disclosure may also be applied to other communication systems, and various modifications based on the technical concept of the embodiments of the disclosure may be made.

The invention claimed is:

1. A method performed by a user equipment (UE) supporting vehicle-to-everything (V2X) communication in a wireless communication system, the method comprising:

receiving, from a base station, priority order information through radio resource control (RRC) signaling or a system information block (SIB), wherein the priority order information indicates a priority order of a global navigation satellite system (GNSS) and a base station, and wherein the base station includes at least one of an evolved node B (eNB) or a next-generation node B (gNB);

receiving, from a plurality of sidelink synchronization sources, a plurality of sidelink synchronization signals (SLSSs), based on the priority order information;

identifying at least one SLSS among the plurality of SLSSs, wherein the at least one SLSS is from sidelink synchronization sources having a same priority and reference signal received power (RSRP) values for the at least one SLSS exceed a preset threshold;

selecting a sidelink synchronization source with a largest RSRP value of the identified at least one SLSS; and performing the V2X communication based on the selected sidelink synchronization source, wherein the plurality of sidelink synchronization sources comprise at least one of the GNSS, the eNB, the gNB, or another UE.

2. The method of claim 1, wherein the receiving of the at least one SLSS comprises receiving at least one of:
a first-type SLSS directly received from the GNSS,
a second-type SLSS received from a V2X UE directly synchronized to the GNSS,
a third-type SLSS received from a V2X UE indirectly synchronized to the GNSS,
a fourth-type SLSS directly received from the eNB or the gNB,
a fifth-type SLSS received from a V2X UE directly synchronized to the eNB or the gNB,
a sixth-type SLSS received from a V2X UE indirectly synchronizing with the eNB or the gNB, or
a seventh-type SLSS received from a preset V2X UE that is not directly or indirectly synchronized to the GNSS, the eNB, or the gNB.

3. The method of claim 2, wherein the third-type SLSS comprises an SLSS received from a V2X UE that is synchronized to a V2X UE directly or indirectly synchronized to the GNSS, and
wherein the sixth-type SLSS comprises an SLSS received from a V2X UE that is synchronized to a V2X UE directly or indirectly synchronized to the eNB or the gNB.

4. The method of claim 1, wherein the priority order information indicates that the GNSS has a higher priority order than the base station or indicates that the GNSS has a lower priority order than the base station.

5. The method of claim 1, wherein the selecting of the sidelink synchronization source comprises;
selecting timing information of the UE as the sidelink synchronization source, in case that RSRP values associated with the plurality of SLSSs do not exceed the preset threshold.

6. The method of claim 1, wherein an RSRP value is measured based on a demodulation reference signal (DMRS) associated with a physical sidelink broadcast channel (PSBCH).

7. The method of claim 1, further comprising:
receiving, from the base station, SLSS transmission configuration information; and
transmitting an SLSS configured by the base station to a preset V2X UE, based on the SLSS transmission configuration information.

8. The method of claim 7, wherein the transmitting of the SLSS configured by the base station to the preset V2X UE comprises transmitting the SLSS configured by the base station to the preset V2X UE, based on at least one of an RSRP threshold value in the SLSS transmission configuration information and or an RSRP threshold value of an SIB received by the UE, and
wherein in case that the UE is connected to a plurality of base stations, RSRP threshold values are configured to correspond to the plurality of base stations.

9. The method of claim 1, wherein a priority order of the eNB and a priority order of the gNB are equal.

10. A user equipment (UE) supporting vehicle-to-everything (V2X) communication, the UE comprising:
a transceiver; and
at least one processor coupled with the transceiver and configured to:
receive, from a base station, priority order information through radio resource control (RRC) signaling or a system information block (SIB), wherein the priority order information indicates a priority order of a global navigation satellite system (GNSS) and a base station, and wherein the base station includes at least one of an evolved node B (eNB) or a next-generation node B (gNB),
receive, from a plurality of sidelink synchronization sources, a plurality of sidelink synchronization signals (SLSSs), based on the priority order information,
identify at least one SLSS among the plurality of SLSSs, wherein the at least one SLSS is from sidelink synchronization sources having a same priority and reference signal received power (RSRP) values for the at least one SLSS exceed a preset threshold,
select a sidelink synchronization source with a largest RSRP value of the identified at least one SLSS, and
perform the V2X communication based on the selected sidelink synchronization source,
wherein the plurality of sidelink synchronization sources comprise at least one of the GNSS, the eNB, the gNB, or another UE.

11. The UE of claim 10, wherein the least one processor is further configured to receive at least one of:
a first-type SLSS directly received from the GNSS,
a second-type SLSS received from a V2X UE directly synchronized to the GNSS,
a third-type SLSS received from a V2X UE indirectly synchronized to the GNSS,
a fourth-type SLSS directly received from the eNB or the gNB,
a fifth-type SLSS received from a V2X UE directly synchronized to the eNB or the gNB,
a sixth-type SLSS received from a V2X UE indirectly synchronized to the eNB or the gNB, or
a seventh-type SLSS received from a preset V2X UE that is not directly or indirectly synchronized to the GNSS, the eNB, or the gNB.

12. The UE of claim 11, wherein the third-type SLSS comprises an SLSS received from a V2X UE that is synchronized to a V2X UE directly or indirectly synchronized to the GNSS, and
wherein the sixth-type SLSS comprises an SLSS received from a V2X UE that is synchronized to a V2X UE directly or indirectly synchronized to the eNB or the gNB.

13. The UE of claim 10, wherein the priority order information indicates that the GNSS has a higher priority order than the base station or indicates that the GNSS has a lower priority order than the base station.

14. The UE of claim 10, wherein the least one processor is further configured to select timing information of the UE as the sidelink synchronization source, in case that RSRP values associated with the plurality of SLSSs do not exceed the preset threshold.

15. The UE of claim 10, wherein an RSRP value is measured based on a demodulation reference signal (DMRS) associated with a physical sidelink broadcast channel (PSBCH).

16. The UE of claim 10, wherein the least one processor is further configured to:
   receive, from the base station, SLSS transmission configuration information; and
   transmit an SLSS configured by the base station to a preset V2X UE, based on the SLSS transmission configuration information.

17. The UE of claim 16, wherein the least one processor is further configured to transmit the SLSS configured by the base station to the preset V2X UE, based on at least one of an RSRP threshold value in the SLSS transmission configuration information or an RSRP threshold value of an SIB received by the UE, and
   wherein in case that the UE is connected to a plurality of base stations, RSRP threshold values are configured to correspond to the plurality of base stations.

18. The UE of claim 10, wherein a priority order of the eNB and a priority order of the gNB are equal.

* * * * *

UNITED STATES PATENT AND TRADEMARK OFFICE
CERTIFICATE OF CORRECTION

| | | |
|---|---|---|
| PATENT NO. | : 11,974,241 B2 | Page 1 of 1 |
| APPLICATION NO. | : 17/309145 | |
| DATED | : April 30, 2024 | |
| INVENTOR(S) | : Ryu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 387 days.

Signed and Sealed this
Eighth Day of October, 2024

Katherine Kelly Vidal
*Director of the United States Patent and Trademark Office*